Dec. 23, 1952     J. R. TOMLINSON     2,622,621
REMOTE-CONTROL VALVE SYSTEM
Filed Nov. 27, 1950
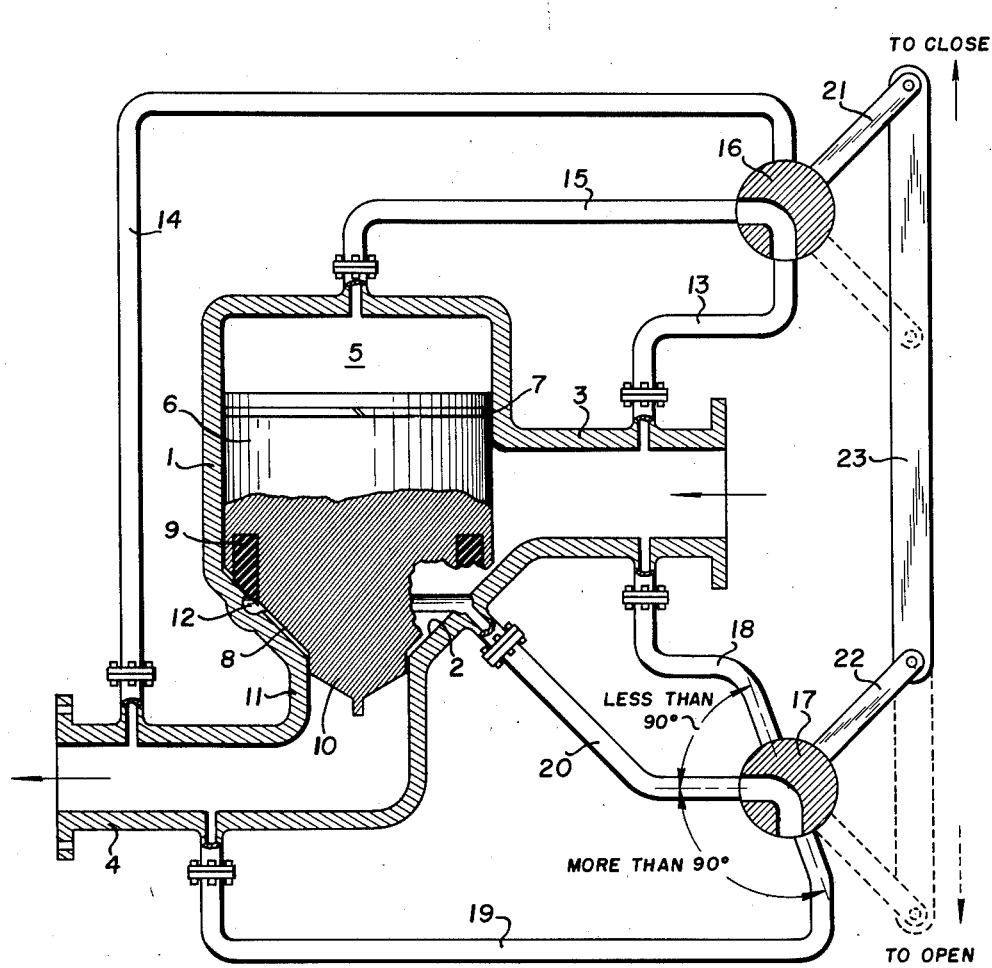
INVENTOR.
John R. Tomlinson,
BY Earl Babcock,
ATTORNEY.

Patented Dec. 23, 1952

2,622,621

UNITED STATES PATENT OFFICE 2,622,621

REMOTE-CONTROL VALVE SYSTEM

John R. Tomlinson, Duncan, Okla.

Application November 27, 1950, Serial No. 197,702

10 Claims. (Cl. 137—690)

This invention relates to valve systems controlled from a remote point by fluid pressure and more particularly to valve systems utilizing the difference in fluid pressure on the opposite sides of a main valve in a conduit for actuating said main valve to open and close the same.

Remote control valve systems are well known. Some of such systems employ, as the source of fluid pressure for operating a main valve in a conduit, the pressure of the fluid in the conduit. The main valve may be in the nature of a simple check valve with a portion of the valve body serving as a piston in a cylinder. The pressure in the cylinder is changed to actuate the valve body to move it either to open or to close the valve.

The present invention relates to valve systems of this kind and especially to those in which the valve body of the main valve is provided with a sealing portion made of flexible material such as rubber, or the like. As heretofore designed, the sealing portions of such valves do not hold their intended shape but extrude along the seating face of the valve body during operation. This extrusion soon causes leakage to occur.

This difficulty is overcome in accordance with the present invention by providing a suitable groove in the valve seat and by controlling the fluid pressure in the groove, by means forming a part of the remote control valve actuating system, at such times as the flexible portion of the body tends to extrude, in such a way as to cause a flow of fluid against the direction of normal flow along the faces of the valve body and valve seat. Additionally, the valve body is constructed in such a way as to assist the remote control system in creating the desired pressure conditions along the seating surfaces of the valve so as to cause the fluid along those surfaces to flow as desired to preserve the flexible portions of the valve body.

Thus the main object of the invention is to provide a valve with an improved shut-off and one with a long life as determined by the number of operating cycles it can withstand before being serviced.

Other objects of the invention will be apparent from the following description of the invention taken in connection with the accompanying drawing, in which:

The single figure is a vertical cross-sectional view of a main valve constructed in accordance with the principles of the invention and with a remote control system, shown diagrammatically, attached thereto.

Referring to the drawing, it will be seen that a main valve housing is there shown at 1 and that the housing is provided with a conical or tapered seat 2 and with an inlet or upstream coupling 3 and an outlet or downstream coupling 4 to make connection in a suitable conduit (not shown), the flow of fluid in which is to be controlled by the main valve, the direction of flow being as indicated by the arrows.

Above the tapered seat 2, the housing is provided with a cylindrical chamber 5 into which the valve body 6 extends. The valve body 6 is shown as of the poppet type and it is provided with a piston ring 7 or the like so as to prevent leakage, to any appreciable extent at least, between the walls of the cylindrical chamber and the upper part of the valve body.

The lower portion of the valve body 6 has a conical or tapered surface 8 corresponding to that of the valve seat 2 and it is provided with a sealing ring of flexible material 9 of rubber, or the like, near the outer edge of the tapered surface 8. The ring 9 may be an "O-ring" or circular in cross-section instead of the shape shown and it may be reenforced with cord or fabric, if desired and the space containing the sealing member need not fit it perfectly as shown.

The valve body 6 also has a depending portion 10 which serves somewhat as a piston in the cylindrical portion or downstream passageway 11 of the housing 1 just beneath the valve seat 2. The depending portion 10 need not have a tight fit in the cylindrical portion 11, however, and, of course, when the valve body is raised from the position shown in the drawing, the portion 10 of the body leaves the cylindrical portion 11 of the housing altogether.

On the valve seat 2, at a radius depending upon that of the flexible ring 9 on the valve body 6, a circular groove 12 is provided. The lower edge of this groove 12 is below and immediately inside the inner edge of the ring 9 and this groove 12 is of such a diameter that its upper edge is between the inside diameter and outside diameter of the ring 9. Thus when the valve body 6 is seated, the groove 12 straddles the lower or inner edge of the ring 9.

Since fluid is to flow through the valve in the direction of the arrows, whether the valve is open or closed the pressure in the upstream coupling is always greater than that in the downstream coupling 4, although when the valve is open, the difference is slight. By means of control conduits 13, 14 and 15, connected to the upstream coupling 3, the downstream coupling 4 and the chamber 5, respectively, and the remote control valve 16, this difference in pressure may be utilized to move the valve body 6 up and down as desired.

When the valve 16 is in the position shown, the control conduits 13 and 15 are in communication and the pressure in the chamber 5 is the same as that in the coupling 3. Since this pressure is greater than that in the coupling 4, the valve body 6 will move downwardly and seat. When the valve 16 is rotated clockwise ninety degrees from the position shown, the control conduits 14 and 15 are in communication and the pressure in the chamber 5 is the same as that in the coupling 4. Since this pressure is less than that in the coupling 3, the valve body 6 will rise if its lower tapered surface 8, or a major portion of this surface 8 can be subjected to the same pressure as that prevailing in the coupling 3.

To control the pressure on the surface 8 and cause the main valve body 6 to rise when the valve 16 is rotated ninety degrees from the position shown, a second control valve 17 is provided and this valve 17 is connected by the conduits 18, 19 and 20 to the coupling 3, the coupling 4 and the groove 12 in the valve seat 2, respectively.

While the invention is described herein, for purposes of illustration, as having the particular control valves and connections shown, it is capable of application with other equipment and connections. For instance, the conduits 14 and 19 might be dispensed with and the points where they connect with the valves 16 and 17, respectively, left open to the atmosphere; assuming that the pressure in the system is higher than atmospheric and that a slight loss of fluid from the system through the conduit 20 to atmosphere when the main valve is closed, is not objectionable.

Also, while the system is of considerable advantage when the control valves 16 and 17 are some distance away from the main valve, the word "remote," as used in this specification and in the claims is not to be regarded as a limitation on how close these control valves may be to the main valve, but only as a word for identifying or distinguishing the control valves from the main valve.

As shown the control valves 16 and 17 have their cranks 21 and 22 connected by a link 23 so that they move in unison. The valve 17 is not exactly like the valve 16, however. Its rotating core is the same, having a ninety degree angle passage therein, but the connections for the conduits 18 and 19 are not spaced exactly ninety degrees from the connection 20. The angle between the points of connection of conduits 18 and 20 is slightly less than ninety degrees and the angle between the points of connection of conduits 19 and 20 is slightly more than ninety degrees, as illustrated.

The main valve body 6 would be operable to open and close the valve if the connections to the valve 17 were not offset as just described but the flexible ring 9 on the valve body 6 would not be protected and the provision of means for offsetting these connections, in combination with the groove 12 and the depending portion 10 on the valve body 6 constitutes an important feature of the invention.

From the above description it will be seen that the valve 17 regulates the pressure in the ring groove 12 during the small intervals of the time when the valve body 6 is just coming to rest on the seat 2 or just leaving the seat. Of course, when the valve body 6 is off of its seat some distance, the pressure beneath the valve body is very nearly the same as that in the coupling 3 and the position of the valve 17 has no appreciable effect at that time. Even when off of its seat, however, the valve body 6 will rise on up to its full open position if the pressure in the chamber 5 is the same as that in the coupling 4, because turbulence of flow of fluid through the valve maintains a slight difference in pressure between the couplings 3 and 4.

To explain the operation of the valve and control system, assume first that the parts are in the position shown and it is desired to open the valve. The control arms 21 and 22 are moved downwardly to the positions shown in dotted lines. As this motion occurs the conduit 20 is connected to the conduit 18 just a fraction of a second before the conduit 15 is connected to the conduit 16. The passage through the valve 17, like that in the valve 16, forms a right angle, but the passage in valve 17 is sufficiently large to span the connecting conduits 18, 19, and 20. Thus in the position shown in the drawing, the passage for valve 17 is in communication with the conduit 19, even though it is not fully matched therewith. Connection of conduits 18 and 20 causes the pressure in the groove 12, and hence the pressure in the annular space between the valve body 6 and the valve seat 2 below the flexible ring 9 to be the same as that in the coupling 3 before the valve body 6 rises. The valve body 6 does not rise until the pressure in the chamber 5 is lowered to that of the coupling 4.

When the pressure in the chamber 5 is brought down to that of the coupling 4, the valve body 6 rises. The initial upward movement is due to the fact that the depending portion 10, though not making a complete seal with the housing 1, temporarily forms a barrier to unlimited communication between the groove 12 and the coupling 4. The pressure along the surface 8 beneath the flexible ring 9 is higher than that beneath the depending portion 10 and it is higher than that in the chamber 5. The area on the valve body 6 along the surface 8 below the ring 9 and above the depending portion 10 (or more accurately a horizontal projection of this conical surface) is subjected to a higher pressure than the corresponding area on the valve body 6 in the chamber 5 and so the valve body rises. As soon as the depending portion 10 clears the housing 1, this difference in pressure along the surface 8 disappears but the valve body continues to rise for the reasons mentioned above.

At no time during the upward movement of the valve body 6 is there an appreciable difference in pressure across the lower lip of the flexible ring 9. The pressure in the groove 12 is not exactly as high as that in the coupling 3 due to the fact that there is some flow past the depending portion 10 but there is not sufficient difference to have any appreciable effect upon the ring 9.

When it is desired to close the valve, the cranks 21 and 22 are thrown back to the position shown in full lines. The action on the closing of the valve is different than that on opening it in that the pressure beneath the ring 9 is then controlled largely by the depending portion 10. As soon as the valve body 6 comes down far enough for the depending portion 10 to engage the wall of the housing 1, the pressure along the valve seat 2 rises to a value higher even than that in the coupling 3. This is due to the fact that the piston 6 then has a differential action. The entire area of the piston in the cylinder 5 is exposed to the pressure in the coupling 3, so the piston moves downwardly, tending to compress the fluid more or less trapped in the space along the seat 2. Thus the fluid along seat 2 is caused to flow outwardly and upwardly across the lower lip of the flexible ring 9 so that there is no tendency for the lip to be pinched off by the metal portion of the valve body 6 just beneath it, as the valve body comes on down to its fully seated position. This will not occur as described however if the groove 12 and conduit 20 were so arranged as to relieve the high pressure along the valve seat 8. To insure optimum operation, the connection for the conduit 19 to the control valve 17 is such that the groove 12 is not connected to the conduit 4 until after the valve body 6 is seated.

Some care must be exercised in using the system. To obtain the best operation, a time relationship must be maintained between the operation of the control valves 16 and 17 and the main valve body 6. If the control valves are actuated too rapidly in closing the main valve, the pressure in the groove 12 may be relieved before the main valve body 6 is fully seated and an important advantage of the present invention will be lost.

While only one embodiment of the invention has been shown and described herein, it is obvious that various changes in the arrangement and construction of parts may be made without departing from the spirit of the invention. Thus, while the main valve shown has a conical or tapered valve seat and a correspondingly shaped surface on the valve body, the invention is not limited to such configuration. Various changes will be apparent to those skilled in the art and the invention should be regarded as limited only by the scope of the annexed claims.

I claim:

1. In a remote control valve system, in combination, a housing having inlet and outlet couplings, a valve seat and a chamber remote from and sealed from the inlet and outlet couplings a valve body having a piston extending into the chamber and provided with a flexible ring for sealing the valve body on the valve seat, two remote control valves with means by which they may be actuated in unison, conduits connecting one of said control valves to the inlet coupling, the outlet coupling and the chamber of said housing whereby that control valve regulates the pressure in said chamber, a groove on said valve seat to provide a pressure area, means downstream with respect to said groove to restrict flow downstream from said groove thereby permitting the building up of pressure along the pressure area provided by the groove and conduits connecting the other of said control valves to the inlet coupling, the outlet coupling and said groove whereby the other of said control valves regulates the pressure along the pressure area provided by said groove, the arrangement being such that the valve body may be seated or unseated by manipulation of said control valves.

2. The combination defined in claim 1 in which said valve body is provided with a depending portion adapted to cooperate with a downstream passageway of the housing to restrict flow of fluid along said valve seat.

3. The combination defined in claim 1 in which said groove is located downstream and immediately inside the inner edge of said flexible ring.

4. In a remote control valve system, in combination, a main valve housing having an inlet coupling, an outlet coupling, a chamber remote from and sealed from the inlet and outlet couplings and a valve seat, said valve seat being provided with a groove to provide a pressure area, a main valve body having a piston extending into the chamber of said housing, a surface corresponding in shape to the valve seat in said housing, a sealing ring of flexible material forming part of said surface and a depending portion beneath said surface adapted to cooperate with a downstream passageway of the housing to form temporarily a barrier to unlimited flow along said surface when the valve body is nearly seated on said valve seat, two remote control valves with means by which they may be actuated in unison, conduits connecting one of said control valves to the inlet coupling, the outlet coupling and the chamber of said housing whereby that control valve regulates the pressure in the chamber, and conduits connecting the other of said control valves to the inlet coupling, the outlet coupling and the groove in said main valve seat whereby the other of said control valves regulates the pressure along the pressure area provided by said groove, the arrangement being such that the valve body may be seated and unseated by manipulation of said control valves.

5. The combination defined in claim 4 in which the connections for the conduits on said first mentioned control valve are spaced ninety degrees and in which the connections for the conduits on said second mentioned control valve are not spaced ninety degrees.

6. The combination defined in claim 4 in which the groove in the valve seat of said housing is located downstream and immediately inside the inner edge of said flexible ring.

7. In a valve control system, in combination, a main valve housing having an upstream coupling, a downstream coupling, a valve seat and a chamber remote from and sealed from the upstream and downstream couplings, a main valve body having a surface adapted to engage the valve seat of said housing, means associated with said chamber for causing movement of the valve body depending on pressure conditions in the chamber, a sealing ring associated with said valve body, two control valves, connections between one of said control valves, the upstream coupling of said housing and the chamber thereof and connections between the other of said control valves, the upstream coupling of said housing and a space along said surface below said sealing ring, the arrangement being such that the pressure in the chamber may be regulated to actuate said main valve body and that the pressure along said surface may be regulated to cause smooth and efficient operation of said main valve body.

8. The combination defined in claim 7 in which said control valves are also provided with connections to the downstream coupling of said housing.

9. The combination defined in claim 7 in which said sealing ring is of flexible material.

10. The combination defined in claim 7 in which said sealing ring is of flexible material and in which a groove is provided in the valve seat of the housing in communication with the connection to one of said control valves.

JOHN R. TOMLINSON.

REFERENCES CITED

The following references are of record in the file of this patent:

UNITED STATES PATENTS

| Number | Name | Date |
|---|---|---|
| 570,727 | Gale | Nov. 3, 1896 |
| 923,568 | Nicola | June 1, 1909 |
| 2,219,761 | Burdick | Oct. 29, 1940 |
| 2,337,841 | Shafer | Dec. 28, 1943 |